May 2, 1961  W. SCHLAPP  2,982,193
EXCHANGEABLE FOCUSING MOUNT FOR EXCHANGEABLE OBJECTIVES
Filed Sept. 28, 1959  4 Sheets-Sheet 1

INVENTOR
WERNER SCHLAPP
BY Toulmin & Toulmin
ATTORNEYS

May 2, 1961 W. SCHLAPP 2,982,193
EXCHANGEABLE FOCUSING MOUNT FOR EXCHANGEABLE OBJECTIVES
Filed Sept. 28, 1959 4 Sheets-Sheet 2

INVENTOR
WERNER SCHLAPP
BY
*Toulmin & Toulmin*
ATTORNEYS

May 2, 1961 W. SCHLAPP 2,982,193
EXCHANGEABLE FOCUSING MOUNT FOR EXCHANGEABLE OBJECTIVES
Filed Sept. 28, 1959 4 Sheets-Sheet 4

INVENTOR
WERNER SCHLAPP
BY *Toulmin & Toulmin*
ATTORNEYS

United States Patent Office 2,982,193
Patented May 2, 1961

2,982,193

EXCHANGEABLE FOCUSING MOUNT FOR EXCHANGEABLE OBJECTIVES

Werner Schlapp, Asslar, Germany, assignor to Ernst Leitz Gesellschaft mit beschrankter Haftung, Wetzlar, Germany Filed Sept. 28, 1959, Ser. No. 842,972

Claims priority, application Germany Sept. 27, 1958

2 Claims. (Cl. 95—44)

The present invention relates to a focusing mount for the exchangeable objectives in photographic cameras. More in particular the present invention relates to an exchangeable focusing mount forming a separate unit for the exchangeable objectives of photographic system cameras, and particularly cameras having a built-in distance meter which is coupled with the focusing mount of the objective.

Photographic system cameras generally comprise a camera casing with the exchangeable objectives and auxiliary devices combined therewith which auxiliary devices are used for adjusting the cameras to particular purposes such, as for example, close-up pictures, reproductions, and the like. It has become known in the art to provide a camera with a built-in distance meter with an exchangeable mirror reflex range finder and exchangeable objectives for varying focusing distances.

It has also become known to equip the exchangeable objectives in such cameras with distancing members and intermediary rings at the camera casing thereby making it possible to adjust the camera to particular purposes such as close-up pictures.

The exchangeable objective for a camera with a slit-type shutter comprises two different units. One unit comprises the lens system, the diaphragm, and the diaphragm adjusting ring, the other unit containing all necessary elements used for the distance measuring. On the other hand, in exchangeable objectives for mirror reflex cameras both of the afore-mentioned units are combined to form one structural unit. It is, however, desirable, to have an objective composed of two different structural units where the system cameras are equipped with a distance meter, in such a manner that the focusing element forms one structural unit, which is the focusing mount and the lens system, the diaphragm and the diaphragm adjusting ring form another separate structural unit. This is desirable for the following reason:

Whenever the focusing means are coupled with the distance meter an accurate focusing can be effected only where the distance over which the focusing mount is extended during the adjustment is comparatively small. On the other hand, the focusing to small distances calls for a focusing mount having a comparatively long linear extension range. It is very complicated to devise a focusing mount meeting both these requirements. Furthermore, the length of a tubular element forming the exchangeable objective must be reduced where a mirror reflex range finder is to be provided between the objective and the camera casing and the focusing mount still has to be capable of adjusting the objective to infinity. With other words, whenever there is provided a mirror reflex range finder between the objectives and the camera casing, a focusing mount is called for having a small basic structural length but covering a good distance of linear extension during its adjusting motion. The reverse condition must prevail where the objective is directly connected with the camera casing and where the focusing is effected by means of the distance meter coupled with a focusing mount.

With the foregoing in mind it is the object of the present invention to provide an exchangeable focusing mount for the exchangeable objectives in system cameras adaptable to various particular purposes such as, for example, close-up pictures, reproductions and the like, which focusing mount has a comparatively small basic structural length, but covering a good distance of linear extension in its adjusting motion so as to have a comparatively great length when fully extended.

This object is achieved by the focusing mount of the present invention for photographic system cameras with a coupling mount, a rotatable adjusting ring and an objective carrier and wherein the length of the objective carrier, when fully extended, is comparatively greater than the structural length of the adjusting ring, and at least twice as long. The rotatable adjusting ring is preferably connected with a double worm screw, whose threading cooperates, on the one hand, with the threading of the stationary coupling mount, and whose second thread, on the other hand, cooperates with the threading of the objective carrier in such a manner, that the pitches are added.

In view of the great range of linear extension of the objective carrier there are provided straight-guide means which are self-extending. In the interior of the focusing mount there is provided a black bellows which is used for absorbing reflected light and which also protects the threadings against dust.

According to the invention there is further provided a support for the camera which can be swivelled about the stationary coupling mount and which can be arrested at a predetermined position. The support is provided with a threading and can be used for attaching the entire mount on a carrier.

The invention will be understood best from the following description of the accompanying drawing in which.

Figure 1:
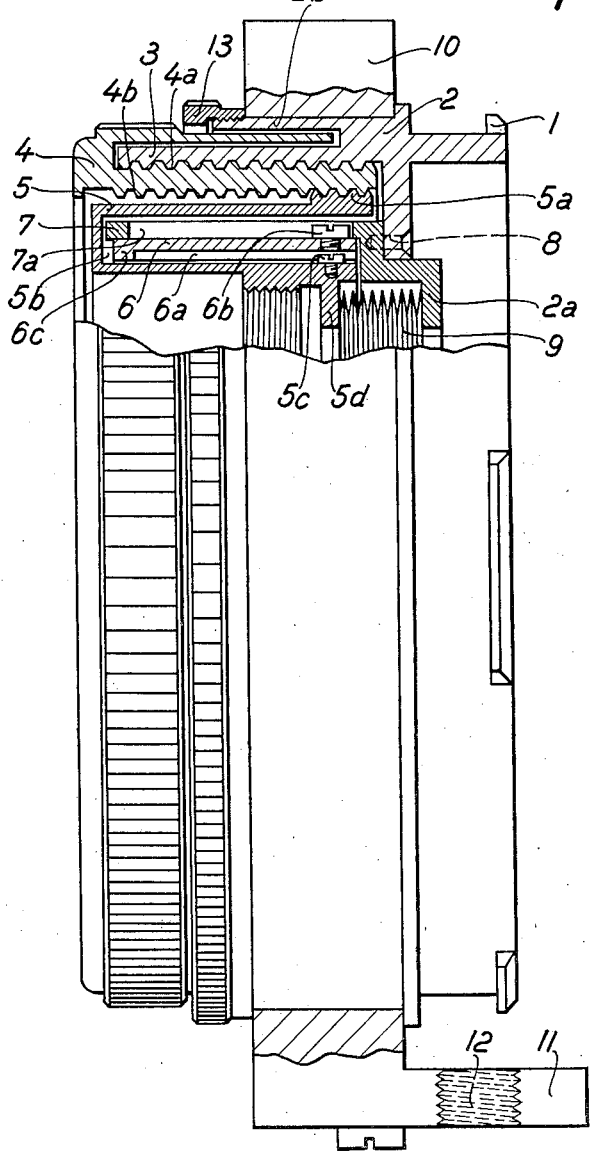
Fig. 1 illustrates a side view of a focusing mount, partially broken open with some portions shown in cross-sectional view, according to the invention.

Referring now to the drawings more in detail and turning first to Figure 1, the focusing mount of the present invention comprises a coupling mount 2 having coupling elements such as, for example, bayonet lugs 1, the coupling mount 2 being provided with a worm screw tube 3. The adjusting ring 4 has a worm screw threading 4a and 4b and is screwed into tube 3. The interior worm screw thread 4b of the adjusting ring 4 cooperates with the worm screw threading 5a of the objective carrier 5. The objective carrier 5 has an axial groove 5b into which there projects the straight-guide slide 6. The objective carrier 5 also is provided with a guide bolt 5c engaging a groove 6a of the straight-guide slide 6.

The straight-guide slide 6 is equipped with a guide bolt 6b engaging the straight-guide groove 7a of straight-guide arm 7. The straight-guide arm 7 is fixedly connected with the coupling mount 2 by screw 8. The straight-guide slide 6 is mounted on the straight-guide arm 7 and can be longitudinally displaced thereon by means of a dovetail guide. Furthermore, there is provided a bellows 9 which is preferably cylinder-shaped and can be extended. This bellows is fixedly connected with flange 5d of the objective carrier 5 and also with flange 2a of coupling mount 2. The support ring 10 is mounted at the external ring 2b of the coupling mount and can be swivelled about ring 2b as an axis. The support ring 10 has a support arm 11 provided with a threading 12 for mounting the focusing mount of the invention on a carrier. The support ring 10 is held upon the external ring 2b of the coupling mount 2 by means of the threaded ring 13.

Figure 2:
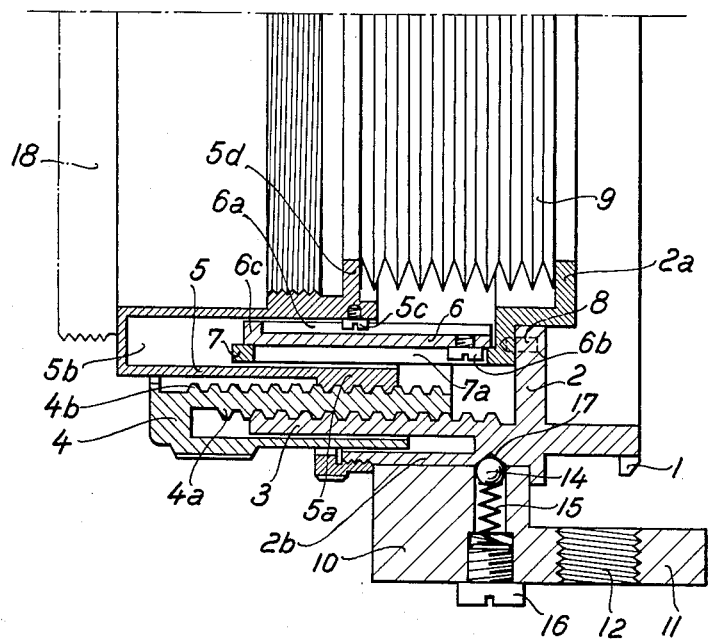
Fig. 2 illustrates a cross-sectional view of a detailed portion of the focusing mount shown in Fig. 1.

Turning now to Figure 2, the focusing mount of the invention is provided with a link member 18 for attaching to the focusing mount an auxiliary device for close-up pictures. There is provided a ball 14 which is pressed into recesses 17 at the coupling mount 2 by screw 16 and spring 15. This ball 14 secures the focusing mount in the support ring 10 against displacement.

Figure 3:
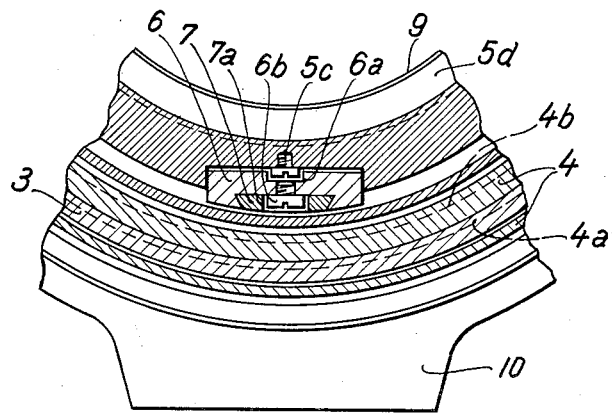
Fig. 3 is a cross-sectional view of the portion shown in Fig. 2 but taken in a plane perpendicular to the plane of Fig. 2.

As shown in greater detail in Figures 2 and 3, the focusing mount is further provided with straight-guide means composed of the elements 5c, 6a, 6b, 7a and 7 for straight-guiding the objective carrier 5 during its axial displacement. The coupling mount 2 is fixedly connected with the elements 7. Furthermore, the coupling mount 2 has at least two recesses 17 adapted to cooperate with ball 14 so as to arrest the support ring 10. The recesses are spaced with respect to each other by 90 degrees at the circumferential coupling mount 2.

The focusing mount of the present invention operates in the following manner: The focusing mount is connected with a camera casing by means of its coupling 1, 2. Between the focusing mount and the camera casing there may be provided a mirror reflex range finder. An objective is inserted into the objective carrier 5. If now the adjusting ring 4 is turned, the screw threading 4a advances in the counter-threading of the screw thread tube 3. Simultaneously therewith, the objective carrier 5 is also axially displaced through its screw threading 5a, its axial movement being straight-guided by means of the straight-guide means 5c, 6a, 6b, 7a and 7. During this operation, the pitches of the threadings 4a and 4b are added. At the same time, the bellows 9 is extended. After a predetermined length of extension, the element 5c of the objective carrier 5 comes in contact with the projecting portion 6c of the straight-guide slide 6 and thereby also displaces the same axially on the straight-guided arm 7. Thereby the straight-guide means for the objective carrier 5 are also extended. The straight-guide means are thus self-extending.

Figure 4:
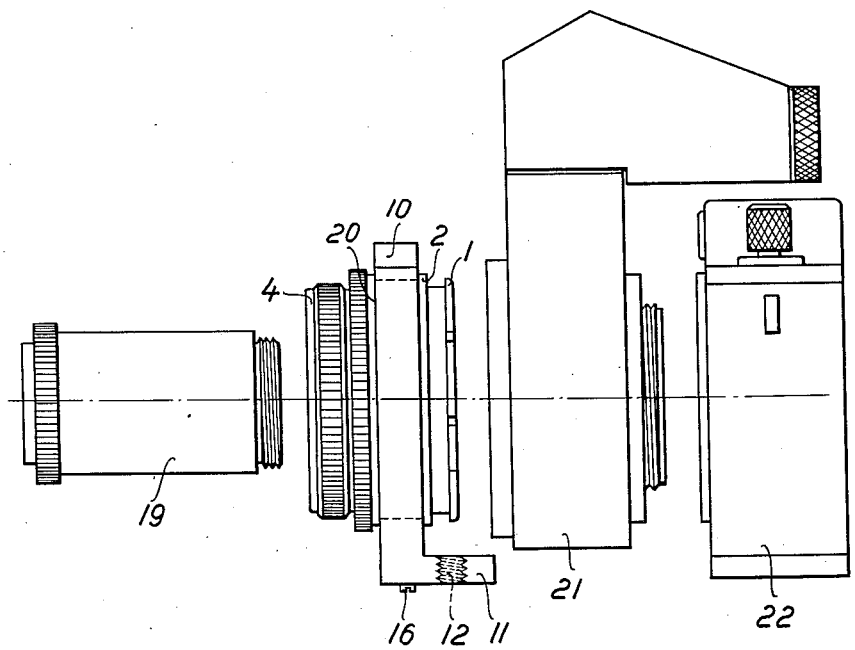
Fig. 4 is an exploded side view of the focusing mount as illustrated in Figs. 1, 2 and 3 in combination with a camera.

Figure 4 shows the combination of the focusing mount of the present invention with a camera. The camera has the objective 19, the focusing mount 20, a mirror reflex range finder 21 and a camera casing 22. Since the camera has the mirror reflex range finder, the focusing mount 20 does not have to be provided with adjusting scales.

Figure 5:
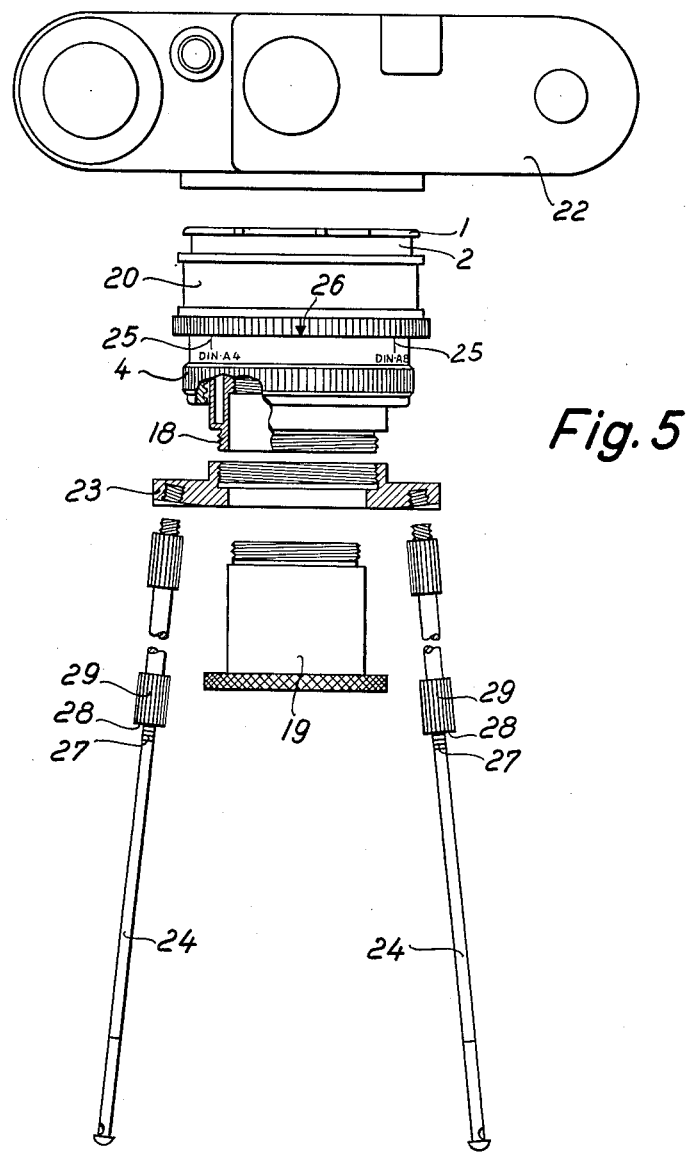
Fig. 5 is an exploded side view of the focusing mount as illustrated in Figs. 1, 2 and 3, in another combination with a camera.

Figure 5 shows the combination of the focusing mount of the invention with the camera having a special auxiliary device for close-up pictures. The adjusting device for close-up pictures comprises a plate 23 having four distancing bars 24 which can be extended and are screwed into plate 23. The adjusting device is provided between the objective 19 and the focusing mount 20. Since the camera is not equipped with a mirror reflex range finder it will be of advantage to provide the mount 20 with a scale 25 and a reading mark 26. The scale 25 can be calibrated with respect to particular sizes of the pictures to be taken, since the four distancing bars 24 are not only used for maintaining a particular distance but can be simultaneously used for limiting the picture to be taken. The bars 24 can be provided with marks for particular picture sizes and indicating the length to which the bars have to be extended. In that case it will be advantageous to provide the focusing mount with corresponding marks. Thereby it is possible to adjust the focusing mount corresponding to a predetermined extension of the distancing bars 24. The distancing bars are, for example, provided with ring marks and the focusing mount is provided with corresponding marks, so that, for example, the mark DIN A4 on the focusing mount corresponds to 4 ring marks 27 on the bars 24. The adjustment of the bars 24 can be effected by turning the screw 29 until its edge 28 meets one of the marking rings 27.

It will be understood that this invention is susceptible to modification in order to adapt it to different usages and conditions and, accordingly, it is desired to comprehend such modifications within this invention as may fall within the scope of the appended claims.

What I claim is:

1. In a photographic system camera, an exchangeable focusing mount forming a separate unit and comprising, in combination, a stationary coupling mount having a screw threading, a rotatable adjusting ring, an objective carrier having a screw threading, straight-guide means for said objective carrier, means for self-extending said straight-guide means, and a double worm screw connected with said adjusting ring and having threadings cooperating with the threading of said coupling mount and with the threading of said objective carrier, with the respective pitches of the threadings being added up, the range of longitudinal extension of said objective carrier thus being greater than and at least twice as great as the structural length of said adjusting ring.

2. In a photographic system camera having an auxiliary device for taking close-up pictures, comprising a support plate, adjustable distancing means on said support plate; an exchangeable focusing mount forming a separate unit and comprising in combination, a stationary coupling mount having a screw threading, a rotatable adjusting ring, an objective carrier having a screw threading, straight-guide means for said objective carrier, means for self-extending said straight-guide means, and a double worm screw connected with said adjusting ring and having threadings cooperating with the threading of said coupling mount and with the threading of said objective carrier, with the respective pitches of the threadings being added up, the range of longitudinal extension of said objective carrier thus being greater than and at least twice as great as the structural length of said adjusting ring.

References Cited in the file of this patent
UNITED STATES PATENTS

| | | |
|---|---|---|
| 1,835,503 | Lemke | Dec. 8, 1931 |
| 2,126,300 | Wittel | Aug. 9, 1938 |
| 2,231,731 | Mihalyi | Feb. 11, 1941 |
| 2,331,658 | Crumrine | Oct. 12, 1943 |